US005796615A

United States Patent [19]

Madaraishi et al.

[11] Patent Number: 5,796,615

[45] Date of Patent: Aug. 18, 1998

[54] CORRECTING METHOD OF AUTOMOBILE'S DOOR FRAME AND MEANS THEREOF

[75] Inventors: Takashi Madaraishi; Tomoaki Nakao; Ryoji Tanaka, all of Hiroshima, Japan

[73] Assignee: Hirotec Corporation, Hiroshima, Japan

[21] Appl. No.: 643,289

[22] Filed: May 8, 1996

[51] Int. Cl.[6] .............................. G06F 19/00; B23Q 17/22

[52] U.S. Cl. .............................. 364/468.16; 29/407.05; 364/468.21; 364/551.01

[58] Field of Search .............................. 29/407.05, 559; 364/468.16, 468.21, 550, 551.01, 579; 414/786

[56] References Cited

U.S. PATENT DOCUMENTS

| | | | |
|---|---|---|---|
| 4,101,817 | 7/1978 | Maeda et al. | 318/603 |
| 4,268,195 | 5/1981 | Regenbrecht | 408/16 |
| 4,589,184 | 5/1986 | Asano et al. | 29/430 |
| 4,615,093 | 10/1986 | Tews et al. | 209/407.04 |
| 4,901,625 | 2/1990 | Bussan et al. | 364/182 X |
| 5,203,811 | 4/1993 | Hirotani et al. | 29/407.05 |
| 5,526,282 | 6/1996 | Nower et al. | 364/507 |

FOREIGN PATENT DOCUMENTS 62-27291 7/1987 Japan .

*Primary Examiner*—Edward R. Cosimano

*Attorney, Agent, or Firm*—Longacre & White

[57] ABSTRACT

In a correcting method of an automobile's door frame by applying a conventional correcting unit, tightening method to securely fix hinges of the door frame by means of jigs is developed, as well as clampers, and the door frame is supported by three points such as two hinges and a damper as if in the same manner as the door frame is supported by two hinges and a door lock in actual installation in a car when the door frame is inspected. The door frame is also slightly touched by a floating unit on an upper corner of reaward edge of the door frame when the door frame is corrected, preventing a slight distortion generated during the correcting operation from being unfairly enlarged. 12 patterns combinations of parameters and 20 correcting approximate equations are prepared. Aforementioned method and means integrally combine carrying-in, setting, inspecting, correcting and carrying-out operations for the door frame in one consecutive process to remarkably shorten the correcting process of the door frame and yet highly qualified corrected door frame is rapidly produced.

6 Claims, 7 Drawing Sheets

| | outside + tolerance | inside + tolerance | inside − tolerance | outside − tolerance |
|---|---|---|---|---|
| outside + tolerance | $a_1, b_1$ | $a_2, b_2$ | $a_3, b_3$ | $a_4, b_4$ |
| inside + tolerance | $a_5, b_5$ | | | $a_6, b_6$ |
| inside − tolerance | $a_7, b_7$ | | | $a_8, b_8$ |
| outside − tolerance | $a_9, b_9$ | $a_{10}, b_{10}$ | $a_{11}, b_{11}$ | $a_{12}, b_{12}$ |

FIG. 7

$$\begin{pmatrix} a_1' \\ a_2' \\ a_3' \\ \vdots \\ a_{12}' \end{pmatrix} = f(x_0 - \bar{x}) \begin{pmatrix} a_1 \\ a_2 \\ a_3 \\ \vdots \\ a_{12} \end{pmatrix}$$

$$\begin{pmatrix} b_1' \\ b_2' \\ b_3' \\ \vdots \\ b_{12}' \end{pmatrix} = f(x_0 - \bar{x}) \begin{pmatrix} b_1 \\ b_2 \\ b_3 \\ \vdots \\ b_{12} \end{pmatrix}$$

CORRECTING METHOD OF AUTOMOBILE'S DOOR FRAME AND MEANS THEREOF

BACKGROUND OF THE INVENTION

1. Field of the Invention

The present invention relates to a correcting method of automobile's door frame. More particularly, the present invention relates to a method of correcting fitting dimension of automobile's door frame and means thereof.

2. Prior Art

Conventionally, a correcting unit of automobile's door frame comprises a correcting unit main body provided approachably and retreatably with respect to a door frame, a pair of correcting heads between which a top edge of the door frame is inserted, a driving means to move the pair of correcting heads, a detective sensor attached to the correcting unit to detect and indicate an original inspecting position of the correcting heads, a sensor to detect and define fitting position of the door frame, a means to control a driving means to move and stop the correcting heads at a predetermined position and a means to calculate fitting accuracy of the door frame by means of a microcomputer, and if resultant value of the fitting accuracy by the microcomputer goes over beyond predetermined tolerance, the microcomputer again calculates bending amount based on the fitting accuracy and a means to control the driving means to move the correcting heads by the calculated bending amount.

The aforementioned composition is explained with reference to FIG.8–10. FIG.8 shows a generic view of conventionally applied correcting unit. Reference numeral 31 indicates a supporting frame of the correcting unit main body. Clampers 34, 35 provided at lower side part of said correcting unit main body to clamp upper frame of a door body 33 of a door assembly 32 including door frame and also clamp lower portion of the main door body 33 of the door assembly 32.The damper 34 is operated by means of a cylinder 36 and the damper 35 is operated by means of another cylinder 37. A correcting unit main body 40 of ⊐ shape is provided on an upper bracket 38 of the supporting frame of the correcting unit main body 31 through a hinge 39 and the correcting unit main body 40 is provided swingably in vertical direction by motion of a cylinder 41. Reference numeral 42 indicates correcting heads to bend an upper door frame 43 melted on the main door body 33. The correcting heads are provided so as to insert the upper door frame between said correcting heads. Said pair of the correcting heads 42 are movably provided in X–X' direction in FIG.8 of the correcting unit main body 40. Reference numeral 44 indicates a step motor to move the correcting heads 42 forwardly and backwardly. Reference numeral 45 indicates a detector to detect the original inspecting position of the correcting heads 42 with respect to the correcting unit main body 40.

Reference numeral 46 indicates a sensor to detect fitting location of a door frame 43. The sensor is mounted on one of the correcting heads 42. A detecting signal issued from the fitting location detecting sensor 46 is sent to a microcomputer 47 which acts as a controller.

Based on such detecting signal, the microcomputer calculates fitting accuracy of the door frame 43 and then practical bending amount x. The correcting amount is converted to a signal to control the number of revolutions of a step motor 44.

Next, operation of said correcting unit is explained hereinafter. The door frame is set at a predetermined position. The correcting unit main body 40 approaches to the door frame 43 so as to place said door frame's top edge between said correcting heads 42, 42. The correcting heads are integrally moved by means of the driving means 44 with respect to the correcting unit main body 42. The correcting heads 42 move to the original inspecting position. The sensor of original inspecting position detects the movement of the correcting heads and the correcting heads stop.

Next, fitting position of the door frame 43 is inspected by a fitting position inspecting sensor and the sensor send a signal to the microcomputer 47. The microcomputer 47 calculates inspection data x to correct the door frame based on the signal received from the microcomputer. The operation system is briefly explained according to FIG.9.

In FIG. 9, the door frame's inspection position is inspected by means of the fitting position detecting means (indicated by reference numeral 51), and then the signal is sent to the microcomputer. The amount to be corrected, namely inspected data 'x' is calculated (reference numeral 52). The inspected data is compared with the tolerance (53). If the inspected data 'x' comes within the scope of the predetermined tolerance, an indication lamp indicates 'satisfactory' (reference numeral 56) and the driving motor does not start. Meanwhile, if the inspected data 'x' goes outside the scope of the predetermined tolerance, the indication lamp indicates 'unsatisfactory' and the microcomputer calculates bending amount 'y' (reference numeral 54) to operate the driving means to move the correcting heads. The door frame is corrected by the amount of the bending 'y' (reference numeral 55). The operation is repeated until the inspected data comes within the scope of the predetermined tolerance and indication lamp indicates 'satisfactory'.

In general, for calculation of such correcting amount an approximate equation obtained from various experiments is applied. This approximate equation is determined taking into consideration difference of car style difference between front and rear doors, bending direction toward inside or outside the door, individuality of door itself, unevenness of each lot of the door frames, etc. In the present invention, the applicant applied the approximate equation of $y=a\sqrt{x}+b$. This approximate equation was disclosed in the prior art of Japanese utility model publication No. 62-27291. In this equation, x indicates inspecting data, y indicates bending amount, and a and b indicate parameters (constants).

The aforementioned description is a brief explanation of prior art.

However, there has been pointed out the following defects in practical operation of the conventional correcting unit.

Only a pair of parameters are allocated for the equation of $y=a\sqrt{x}+b$ and such a pair of parameters are widely applied for all the calculations. As correcting amount often changes due to an indivisuality of the door frame or unevenness of each lot of the door frames, high quality accuracy of correcting result has not been expected. If high quality accuracy of correcting result is expected, the parameters must be changed whenever door frames are processed. Unless various combinations of parameters a and b are prepared, it is not possible to expect high quality correcting of door frames. This change of combination of parameters is much troublesome in practical operation and it disturbs smooth operation of correcting unit. This has been considered to be a bottleneck in actual production.

In conventional correcting method, carrying-in process of door frame, setting-in process of door frame, correcting process of door frame, taking-out process of door frame were all independent processes. It is desired to combine all these processes in one consecutive process. Also taking into consideration that the least correcting amount will impart the least effect to the quality of final door frame product in such as good appearance or rigidity, the applicant presents a full consecutive process of carrying-in, setting-in, correcting and taking-out operation of door frame which has not existed in the prior art as well as the least correcting amount by applying predetermined various combinations of parameters.

SUMMARY OF THE INVENTION

The present invention comprises following method and construction:

(1) Unlike conventional correcting process of door frame, the present invention offers a unified consecutive operation of carrying-in, hinge-setting, inspecting, correcting and taking-out of the door frame in one process.

(2) In order to make the above mentioned one consecutive process possible the applicant has developed a new door hinge setting jig and tightening process which have not existed in conventional method.

(3) After hinges are set, inspecting and correcting operations of the door frame are carried out in such a manner as if said door frame is actually installed in an automobile.

(4) In conventional correcting method number of parameters prepared for calculation by approximate equation is not enough. If unevenness of each lot of door frames occurred, high quality correction becomes unexpected. It is thus recommended to prepare various combinations of parameters from applicant's many and many experiments. Finally, the applicant came to the conclusion that 12 combinations of parameters a and b offer the best result.

(5) The correcting process is the final finishing process. The products are taken out immediately after the correcting operation is over.

As aforementioned, the present invention has taken up new fittings such as hinges, clampers, floating unit and supporting method of door frame thereby. The present invention succeeded in unifying four operations in one consecutive process. It became possible to save processing area and number of operators. The time required for full operation became quite shortened. It has succeeded to offer a great contribution to production amount and production cost.

BRIEF DESCRIPTION OF THE DRAWINGS

FIG.7: Calculation of correcting amount due to change of parameters and alteration of parameters.

DETAILED DESCRIPTION OF THE PREFERRED EMBODIMENTS

Figure 1:
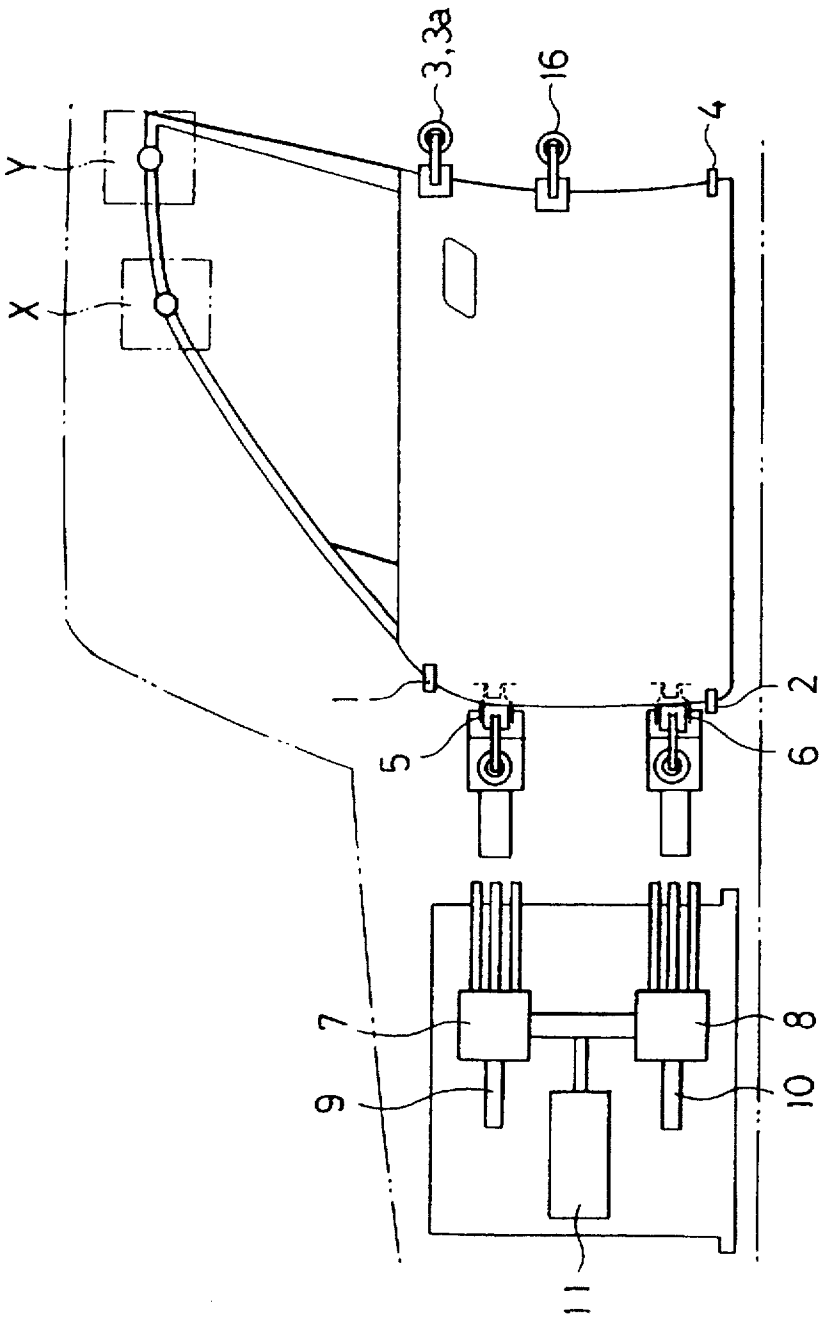
FIG.1: An explanation of the automobile's door frame correcting unit according he present invention.

The present invention will be hereinafter described with reference to preferred embodiment.

The door frame coming into a processing site by means of a robot is placed on a table. The door frame main body is clamped by clampers at least four positions, two of which locate at forward end of the door frame and another two of which locate at rearward end of the door frame. These clampers are provided on four corners of the door frame main body and indicated with reference numerals 1, 2, 3 and 4 in FIG. 1. Clampers of cylinder pressing type are commonly used. At the location of forward end of the door frame there are provided two hinge setting positions with respect to said door frame. An operator sets the hinge to a jig on a running carrier previously prepared. There is provided on the jig a clamper 14. The hinge is clamped by this clamper 14 and securely fixed onto the jig.

The jig and the hinge run together by means of a cylinder 15 and the hinge is set on the door frame's hinge setting position. After the hinges 5 and 6 are set, nut runners 7 and 8 supporting bolts on their heads run into the predetermined position where the hinges are held and the nut runners tighten the bolts concurrently. After the nut runners tighten the bolts with predetermined torque the nut runners automatically stop and the nut runners revert from the door frame. Reference numerals 9 and 10 indicate guide rails. The guide rails are provided for nut runners 7 and 8. The nut runners run on the guide rails when the nut runners are pressed by the cylinder 11.

Figure 2:
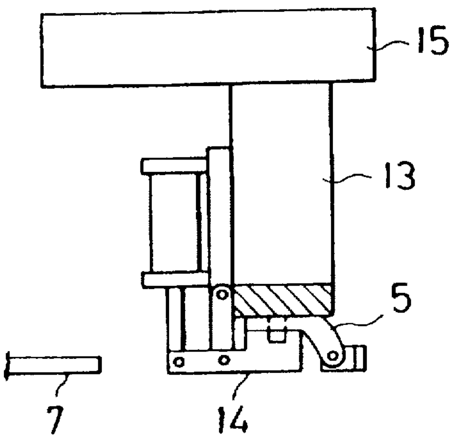
FIG.2: An enlarged view of the main part of the hinge setting unit of the correcting unit of FIG. 1.

FIG. 2 is an enlarged top view of the main part of the hinge setting unit. Reference numeral 5 indicates a hinge, 7 indicates a nut runner, 13 indicates a table, 14 indicates a damper and 15 indicates a rodless cylinder.

After the two hinges are securely fixed to the door frame, a damper 16 located on opposite side end of the door frame is set substantially at central portion of the door frame (actually the latch of the door lock and the striker engage with each other). It is recommended to provide standard holes inside the door frame to have firm installation of the door frame. Inspection of the door frame is now prepared by clamping said door frame by the three points such as the hinge 5, the hinge 6 and the damper 16. Then dampers 1, 2 and 4 are unclamped. The clampers 1, 2 and 4 are retreated from the door frame. The damper 3 has a floating unit with it. Clamping is released but it is unnecessary to separate the damper 3 from the door frame because the damper 3 has the floating unit.

The three supporting points, namely, supporting by the two hinges 5 and 6 and the damper 16 keep the door frame substantially in the same manner as the door frame practically installed in the automobile. This supporting manner is most reliable when inspecting and correcting of the door frame are performed.

Inspecting of the door frame is carried out at selected two upper points of the door frame. As shown in FIG. 1, reference character X and another reference character Y indicate such upper points of the door frame.

Figure 3:
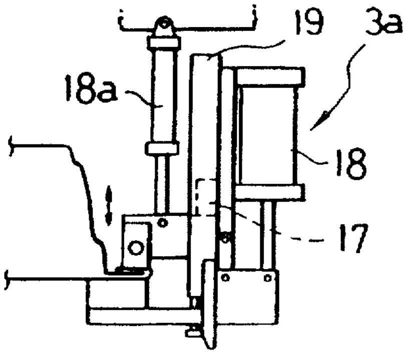
FIG.3: An explanation drawing of a floating unit which is an auxiliary supporting unit of door frame correcting unit.

As shown in FIG. 3, a floating unit 3*a* installed in the damper 3 comprises first air cylinder 18*a*, linear guide and clamping cylinder 18 slidably fixed to a slider 17 of the linear guide and a fixing element fixed to the slider 17 through a bracket 19. The fixing element is connected to the first cylinder 18*a* of a piston rod.

The first cylinder 18*a* is deaerated to release the damper from hemming part of the door frame. The damper still contacts the door frame but it is movable with the slider. The damper does not impart any effect to correcting operation.

Namely, when the first air cylinder installed in the damper 3 is deaerated, the door frame looks as if it is supported by four points, but the floating unit 3*a* does not clamp the door frame but it holds the door frame. It slightly touches the door frame when the door frame is corrected. The existence of this floating unit is highly evaluated in the present invention to prevent a slight distortion generated in the correcting operation of the door frame from being unfairly enlarged. This floating unit has never existed in conventional correcting unit of the door frame.

The floating unit may be installed at the location of the damper 4. However, from technical processing point of view, it is not desirable to increase number of floating unit because it disturbs flow of processes when number of floating unit is unnecessarily increased. The present invention offers only one floating unit at the location of the damper 3. Next, inspection and correcting performance at selected points X and Y indicated in FIG. 1 are explained.

Figure 8:
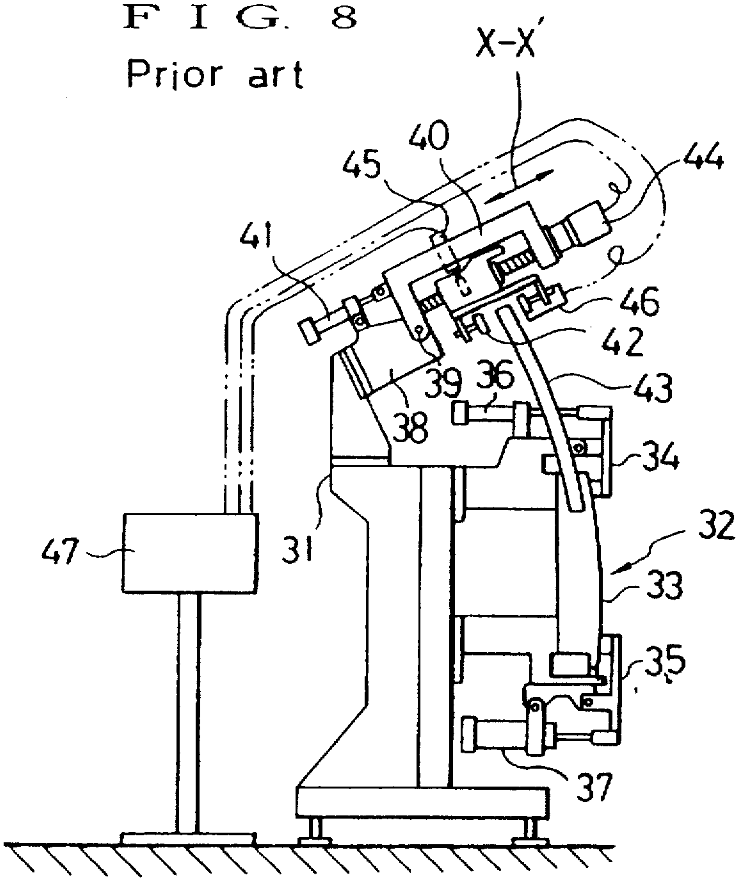
FIG. 8 Prior art
FIG.8: conventional correcting unit.
Figure 9:
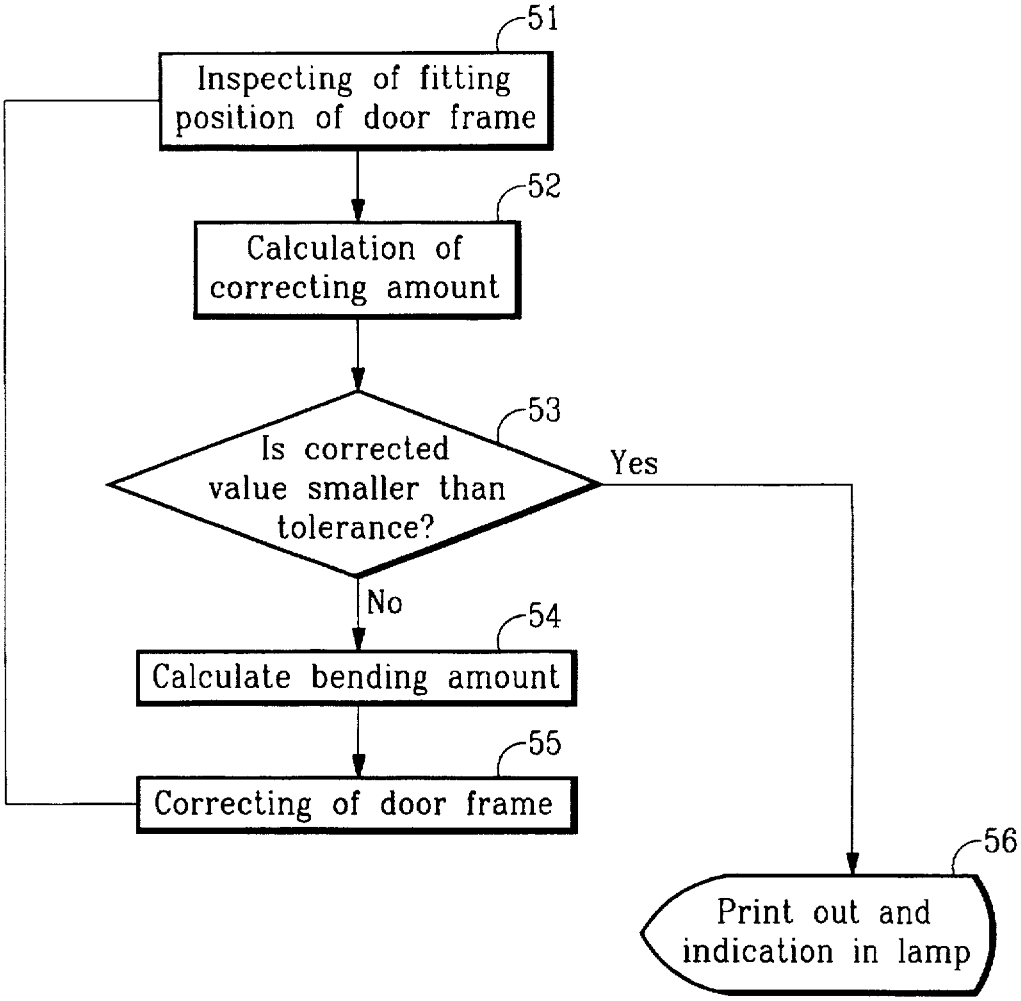
FIG. 9 Prior Art
FIG.9: Flow chart indicating order of correction in conventional correcting unit.

Inspection is carried out by supporting the door frame main body at three points such as positions of hinges 5 and 6 and the damper 16. This condition offers substantially the same manner as the door frame is practically supported by hinges and a door lock in the car. At first the cylinder (shown with reference numeral 41 in FIG. 8) of the correcting unit is operated to move the correcting parts 40 having ⊐ contour from above to place top portion of the door frame between the correcting heads. The distance between the one correcting head and the door frame is detected. This detecting operation is made at each X and Y point. The distance inspected by a detector is converted to a signal and the signal is immediately transmitted to a microcomputer (not shown in FIG. 1). The microcomputer calculates, inspected data.

Figure 4:
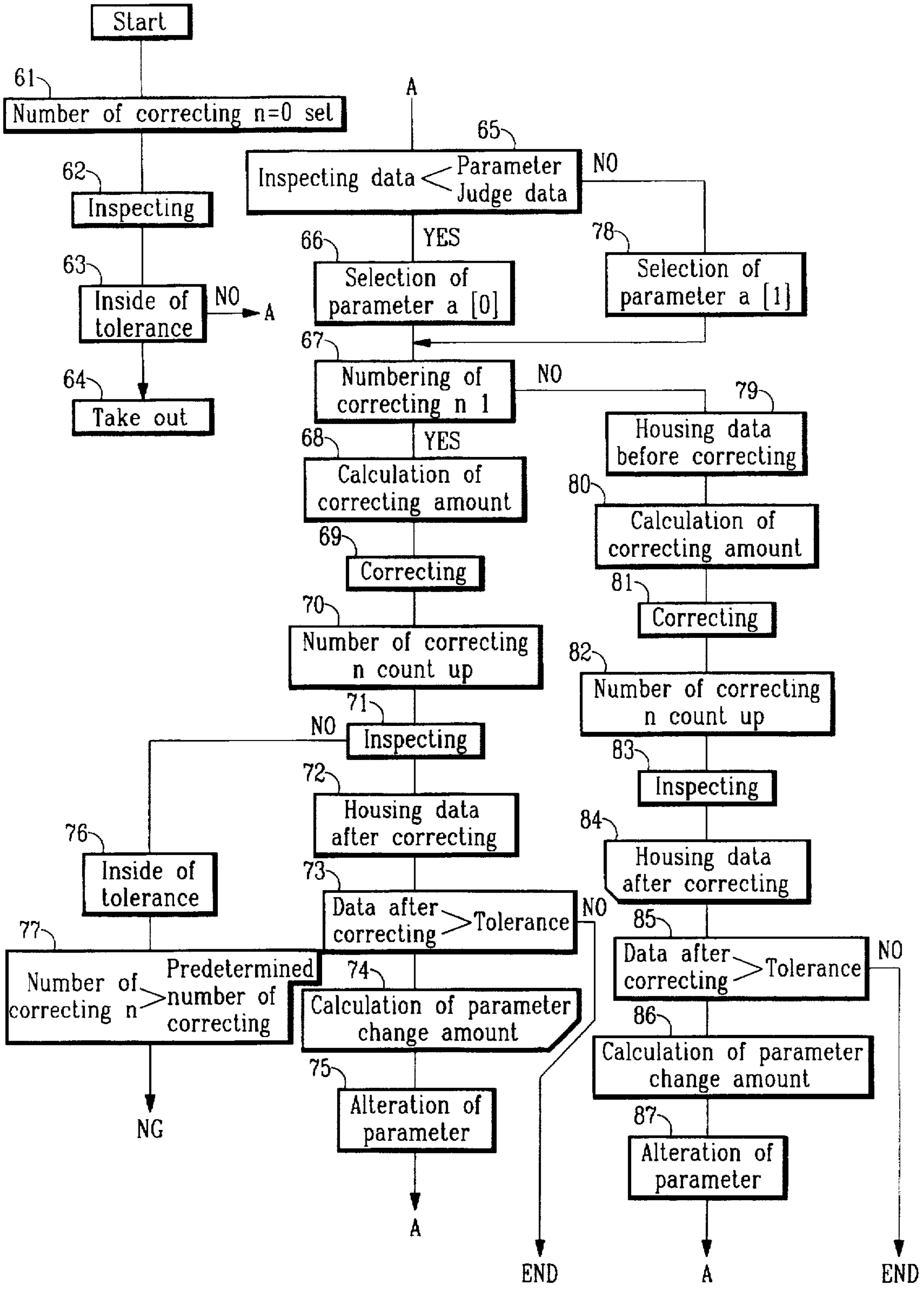
FIG.4: Flow sheet indicating choice of inspection parameter, calculation of correcting amount and order of correcting process in the door frame correcting method.

In FIG. 4, the door which is set on the jigs has not been corrected yet, and is indicated at reference numeral 1. When inspection is started, it is indicated by reference numeral 2. If inspected data obtained at points 'x' and 'y' come within the predetermined tolerance (the tolerance is commonly with 1 mm), the door frame is judged as 'satisfactory' and the door frame is approved as a satisfactory product.

If inspecting data obtained at either X point or Y point falls outside the predetermined tolerance, the door frame is judged as unsatisfactory product and said door frame is transmitted to the process indicated with reference character A in FIG. 4.

There are four cases at X point that the distance between the correcting head and the top portion of the door frame comes outside +tolerance, inside +tolerance, inside −tolerance and outside −tolerance. In the meantime, there are four cases at Y point that the distance between the correcting head and the top portion of the door frame comes outside +tolerance, inside +tolerance, inside −tolerance and outside −tolerance.

Combination of tolerances at X point and Y point is 4×4=16. However, there are four combinations in which both X and Y points indicate inside +tolerance and inside −tolerance, respectively. In these four combinations no correction is required. Thus correcting patterns are 16−4=12. These combinations are shown in FIG. 5.

Among the above 12 patterns, there are four patterns at X point inspected inside +tolerance and inside −tolerance. Four patterns mean four equations. In the meantime, there are eight patterns inspected outside +tolerance and outside −tolerance. The parameters are divided to a |0| and b |1| patterns. Thus patterns are 8×2=16, namely, 16 equations. Accordingly, 4+16=20 equations are prepared.

A basic equation to calculate the correcting amount is as aforementioned $y=a\sqrt{x}+b$. In the present invention parameters of a and b are provided for each of 12 patterns. According to experiences, it is recommended to have less correcting amounts in the scope near the tolerance. While, much correcting amounts are required in the scope far from the tolerance. Therefore, parameters of a |0| and b |1| are prepared around the boundary of a judge point.

Figures 5, 6:
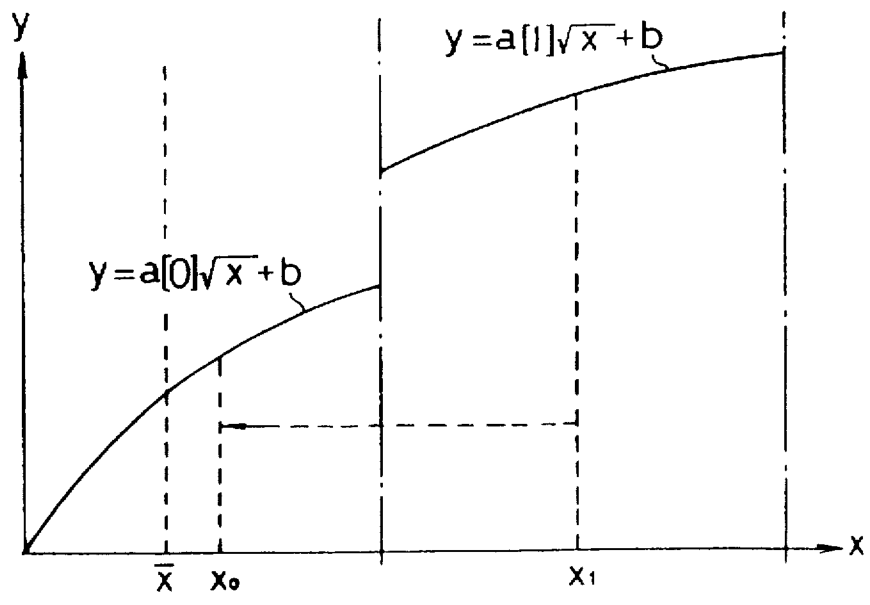
FIG.5: Combination of parameters.
FIG.6: A graphical relation between the correcting data and the correcting amounts.

FIG. 6 illustrates a pattern in which a variation of correcting amount based on inspected data in the case of $Y=a|0|\sqrt{x}+b$ causes to be transferred to $y=a|1|\sqrt{x}+b$ beyond the judge point due to change of value of correcting amount. In FIG. 6 x indicates tolerance, $x_1$ indicates data before correcting, $x_0$ indicates data after correcting, y indicates correcting amount, x indicates inspecting data, one point chain line on x shows a changing point to select a parameter from $y=a|0|\sqrt{x}+b$ to $y=a|1|\sqrt{x}+b$ or vice versa.

Figure 10:
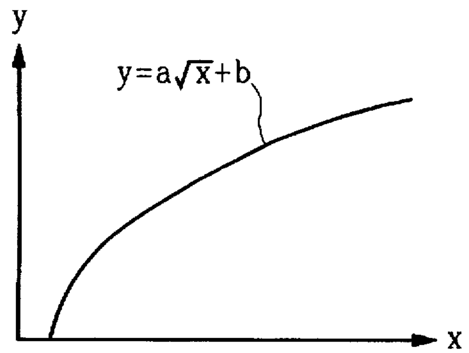
FIG. 10 Prior Art
FIG.10: Approximate equation indicating correcting data and correcting amount in the conventional correcting unit of the door frame.

FIG. 10 illustrates prior art. This figure indicates a curve having no judge points at X and Y points. On the other hand, the present invention provides 12 patterns 20 equations. This 12 patterns and 20 equations can cover all variations of correcting the door frames. Both at X point and Y point, 12 patterns and 20 equations are provided, respectively, and desirable effects are obtained in practical operation.

In FIG. 4 a step after reference character A is a step to select one parameter either a [0] or a |1|.

For instance, if inspecting data locate in left hand with respect to the judge point indicated in FIG.6, namely, the inspecting data exist in the region near the tolerance, one combination of constants a and b is selected (see step 66 of FIG. 4) from the parameter a [0] previously prepared to calculate correcting amounts 'y' by means of microcomputer. If inspecting data locate in right hand with respect to the judge point indicated in FIG. 6, namely, the inspecting data exist in the region far from the tolerance, another combination of constants a and b is selected from (see step 78 of FIG. 4) the parameter a [1] previously prepared to calculate correcting amounts by means of microcomputer. An actuator (servomotor or other driving means) is driven for correcting the door frame according to a calculation signal from the microcomputer (see steps 69 and 81 in FIG. 4.)

Prior to starting correcting operation, the first air cylinder 18*a* of the damper 3 is moved to clamp hemming part of the door frame. The floating unit 3*a* varies position to clamp the hemming part freely, it prevents the door frame from being distorted when the door frame is corrected. After the first correcting operation is over, the first cylinder 18*a* of the floating unit 3*a* is deaerated and the supporting condition reverts to the three points supporting. Next, the sensor attached to the correcting part again detects the distance between the correcting heads and the corrected tip portion of the door frame. The inspecting datum is again sent to the microcomputer to calculate the inspected data (see step 83 of FIG. 4). The inspecting data obtained at X and Y points come within the scope of the tolerance and then the inspecting operation is over (see step 85 of FIG. 4).

Fundamentally, it is preferable that correction at both X and Y points should be within tolerance by only one operation selecting parameters either a |0| or b |1|. However, if inspecting data do not come within the tolerance after correcting and inspecting, it is desired to change parameter from a |0| to a |1| together with change of constants a and b. The constants a and b are changed according to experiences from among the 12 patterns. The present invention offers some prepared equations and constants a and b to quickly change them according to results of correcting and inspecting.

As shown in FIG. 4, inspecting data are housed (see step 79) prior to correcting and inspecting data after correcting come to outside of tolerance (see steps 85 and 73), the inspecting data before and after correcting are compared so as to change the value of parameter a |0| or b |1|, namely, $(a_1, b_1)$, $(a_2, b_2)$ . . . $(a_{12}, b_{12})$ (see steps 74 and 86). Coefficients $a_1, a_2, \ldots A_{12}; b_1, b_2, \ldots b_{12}$ in FIG. 7 indicated the coefficients beforoe being automatically converted. The coefficients are converted to $a_1', a_2', \ldots A_{12}'; b_1', b_2', \ldots b_{12}'$ by means of the functional equation $f(x_0-x)$. It becomes possible automatically change the contents of parameter a |0| (see steps 75 and 77).

Change of parameter a |0| or b |1| may be proceeded in each correcting operation. It is also possible not to change parameter after first correcting and inspecting were carried out. It depends upon the judgment at step 67. By this method, setting of parameters due to the change of rigidity of the door frame becomes unnecessary. Thus the process has become shortened. Preparation of two sets of parameters offers advantages to prevent somewhat shortage of correcting or over correcting in the vicinity of some inspecting data. If the above mentioned correcting and inspecting are repeated as predetermined times but the results do not come into tolerance, the door frame in question is treated as |Unsatisfactory| product.

Flow of operation such as carrying-in, preparation of correcting, operation of correcting and taking-out of the door frame as aforementioned are briefly explained as follows:

A lot of door frames are delivered to first predetermined position by means of carrier after pressing process. The door frames stand by there for being transferred into correcting process. There is provided a first robot with carrying-in arm to take up a door frame from the first predetermined position to transfer said door frame to a table of correcting operation. Said first robot is supported by a first robot station existing at the same position as the first robot. Opposite to said first robot and first robot station there is provided a second robot with taking-out arm to take up a processed door frame from the correcting table to transfer said processed door frame to second predetermined position.

The first robot received a signal from a door frame operator takes up a door frame from the first predetermined position to transfer said door frame to the correcting table. Then a signal is sent to the clampers. The flow of operation after clamping by the clampers are as described in detail as aforementioned. After correcting operation of the door frame on the correcting table is over, the second robot received the finishing signal takes up the already corrected door frame to move it to the second predetermined position by means of the taking-out arm. The door frames are accumulated in the second predetermined position until predetermined number of the door frames is reached and then the door frames are taken out by means of a carrier.

Such a flow of carrying-in operation, preparation of correcting, operation of correcting and taking-out operation of corrected door frame, is carried out as a complete consecutive operation. This is one of the characteristics of the present invention. The first robot, the first robot station, the second robot and the second robot station are not necessarily specified ones. Drawings of the robots and the robot stations are omitted.

ADVANTAGES OF THE INVENTION (1) Resetting of parameters due to variation of rigidity of door frame becomes unnecessary. Thus it becomes unnecessary to introduce parameters. By providing two parameters it prevents the door frame from being insufficiently corrected or over corrected in the vicinity of the region of inspecting data.

(2) Alteration of parameters is carried out automatically. Process of replacing one combination of parameters to another combination of parameters is eliminated. Error of setting parameters is also decreased.

(3) By correcting operation and tightening process in an automatic consecutive operation, installation of each operation unit is eliminated. Thus elimination of working space and decreasing number of operators was materialised and manufacturing cost decreased.

(4) Due to application of 12 patterns 20 equations, correcting of door frames of any kind becomes possible without variation. Tightening of hinges and correcting of door frames are carried out without any trouble.

What is claimed is:

1. A correcting method of an automobile's door frame applying a correcting unit comprising a correcting unit main body provided approachably and retreatably with respect to a door frame, a pair of correcting heads provided to place a top edge portion of the door frame between the correcting heads, a driving means to move the correcting heads toward the top edge portion of the door frame, a detective sensor of inspecting position to detect original inspecting position of the correcting heads fixed to the correcting unit, a sensor of inspecting fitting position of the door frame, a means to control the driving means to stop correcting heads to a predetermined position, a function to calculate fitting accuracy of the door frame, a function to calculate bending amount based on the correcting amount when the calculated fitting accuracy goes over beyond a tolerance, the correcting method comprising:

a step to securely fix a door hinge to a predetermined position of a jig with respect to the door frame, a step to integrally secure the door hinge to the jig placed on a predetermined position by means of an automatic tightening device provided with bolts and nuts, a step to inspect fitting accuracy of the door frame integrally held with the door hinges to compare said inspected fitting accuracy with separately measured standard fitting dimension and calculate correcting amount and changing amount, a step to correct the door frame to place inspecting data of the corrected door frame within a tolerance of standard fitting dimension, all aforementioned steps are combined in one consecutive process.

2. A correcting method of an automobile's door frame according to claim 1, wherein the door frame is supported by two hinges for fitting said door frame to a car provided at a predetermined forward end of said door frame and further by a damper provided substantially at the center of rearward end of said door frame.

3. A correcting method of an automobile's door frame according to claim 1, wherein the door frame is supported by two hinges for fitting said door frame to a car provided at a predetermined forward end of said door frame and a damper provided substantially at the center of rearward end of the door frame and further by a floating unit provided near the upper corner of the rearward end of the door frame so as to prevent a slight distortion of the door frame generated during correcting operation from being unfairly enlarged.

4. A door frame correcting unit comprising a correcting unit main body, a pair of correcting heads provided to place the edge portion of the door frame between said correcting heads, a driving means to drive said pair of correcting heads, a detective sensor to detect original inspecting position of the correcting heads fixed to the correcting unit, a sensor of inspection of fitting position of the door frame, a means to control the driving means to place the correcting heads to a predetermined position, a means to calculate fitting accuracy of the door frame, a means to calculate bending amount based on the correcting amount when the fitting accuracy goes over beyond a tolerance, a means to control the driving means to move the correcting heads by the bending amount, said correcting unit comprising the following parts:

a pair of hinge sets 5 and 6, door frame dampers 1, 2, 3 and 4 to hold the door frame, hinge tightening device comprising nut runners 7 and 8, guide rails 9 and 10, and cylinder 11 for the nut runners, a floating unit 3*a*, a means to inspect door fitting accuracy, a microcomputer to calculate correcting amount a means to correct door fitting accuracy, first robot to carry in the door frame and second robot to take out the door frame, and first robot supporting station and second robot supporting station.

5. A door frame correcting unit according to claim 4, wherein the floating unit comprises damper and bracket 19 whose locations are determined by a cylinder 18 and a linear guide slider 17.

6. A correcting method of an automobile's door frame according to claim 1, wherein said method comprising:

inspecting and correcting the door fitting dimension, calculation of correcting amount and recorrecting, a function of microcomputer to automatically correct and change parameters based on the changed amount of inspected value, and a function to select a suitable pair of patterns and equation from among the predetermined 12 patterns 20 equations based on the inspecting data to be corrected at each position of the two correcting positions of the top edge portion of the door frame.

* * * * *